Figure 1:
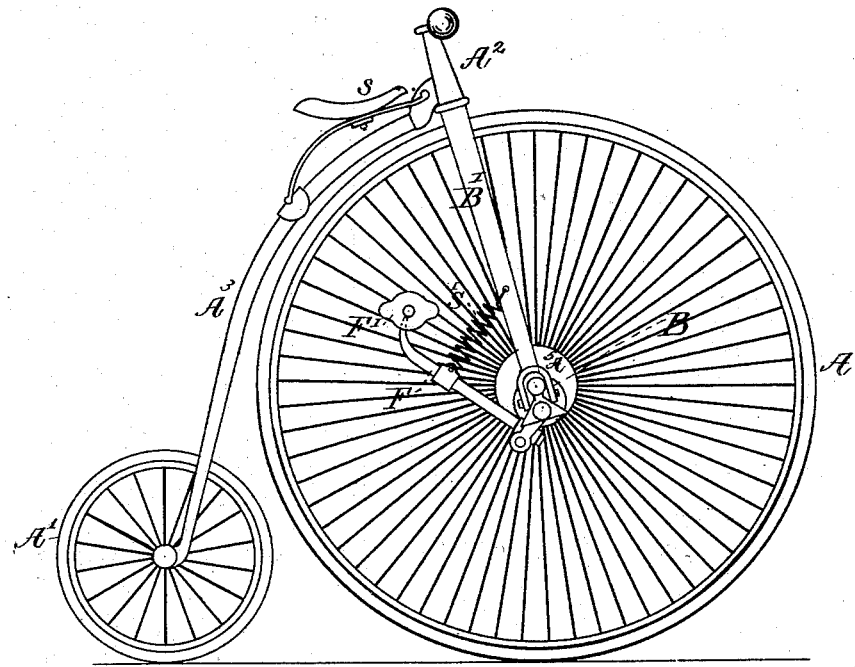

(No Model.) 3 Sheets—Sheet 1.

C. H. WARNER.
VELOCIPEDE.

No. 282,938. Patented Aug. 7, 1883.

WITNESSES
H. I. Nash.
E. R. Benson

INVENTOR
Charles H. Warner
By Charles E. Pratt
Atty

N. PETERS. Photo-Lithographer, Washington, D. C.

(No Model.) 3 Sheets—Sheet 2.

C. H. WARNER.
VELOCIPEDE.

No. 282,938. Patented Aug. 7, 1883.

WITNESSES
H. I. Nash.
E. R. Benson.

INVENTOR
Charles H. Warner
By Charles E. Pratt
Atty (No Model.) 3 Sheets—Sheet 3.

C. H. WARNER.
VELOCIPEDE.

No. 282,938. Patented Aug. 7, 1883.

WITNESSES
H. I. Nash.
E. R. Benson

INVENTOR
Charles H. Warner
By Charles E. Pratt
Att'y

UNITED STATES PATENT OFFICE.

CHARLES H. WARNER, OF BOSTON, MASSACHUSETTS.

VELOCIPEDE.

SPECIFICATION forming part of Letters Patent No. 282,938, dated August 7, 1883.

Application filed June 17, 1882. (No model.)

*To all whom it may concern:*

Be it known that I, CHARLES H. WARNER, of Boston, in the county of Suffolk and State of Massachusetts, have invented certain new and useful Improvements in Bicycles and other Velocipedes, of which the following is a specification.

Heretofore the prevailing construction of a bicycle as to its driving mechanism has been that of a driving-wheel on a fixed axle, having its bearing on either side the wheel in the frame of the bicycle, and with oppositely-projecting foot-cranks attached, one to each end of the axle outside of the bearing, by means of the revolution of which cranks the bicycle is propelled by the foot of the rider. Other constructions have been contrived by which the crank was attached to a different shaft, connected with the axle of the driving-wheel by gears or toothed wheels; and various other contrivances have been devised, all of which required that the seat of the rider be placed nearly up to a vertical position over the axle of the driving-wheel; but the difficulties of noise, of increased friction, of loss of leverage, and otherwise attending these departures from the construction first above mentioned, have been such as to prevent their general adoption. A number of different contrivances have been applied to two-wheeled velocipedes in the effort to produce a machine on which the seat for the rider could be placed far enough back from a perpendicular through the axle of the forward wheel to insure the safety of the rider against being pitched forward by the passage of the forward wheel over obstructions, and these two-wheeled velocipedes have sometimes been referred to as "safety" bicycles. In some the oppositely-projecting cranks upon the axle of the forward wheel have been retained with lever attachments more or less practicable for carrying the pedal or point of application for the foot of the rider backward, so that the general necessity may be met which exists in velocipedes, for their best practicable construction of having the pedal nearly under the seat of the rider, so that the rider may propel by changing his weight from one foot to the other, in the natural manner of walking. In some of these constructions the cranks have been abandoned and clutch mechanism applied, consisting of ratchet-wheels with clicks, drums, and straps and levers, &c., in all of which, so far as I am aware, the difficulties before referred to of noise in operation, increased friction, loss of leverage, and complication and weakness, or liability to breakage and displacements, in the details of construction, have been incident.

It is the object of my improvements to construct a two-wheeled velocipede in which the seat of the rider may be placed at a safe distance from a perpendicular through either axle, and at the same time in an advantageous position in other respects as to propelling, steering, &c., to overcome the difficulties referred to, and to supply a driving mechanism which may be used either in a two-wheeled velocipede, or in other forms of foot-propelled vehicles, which shall be direct and noiseless in action, enable the rider to propel with less exertion than has heretofore been required, and to impel his foot through a shorter arc; also, to provide a driving mechanism by means of which the speed of the velocipede may be "geared up" or "geared down;" also, to provide a driving mechanism by the use of which the operative movement of the feet may be fully utilized and the intervals between the operative movements may be attended with rest instead of idle exertion; and other objects, as well as the peculiar nature of my improvements, will appear from the following description and the accompanying drawings.

Figure 8:
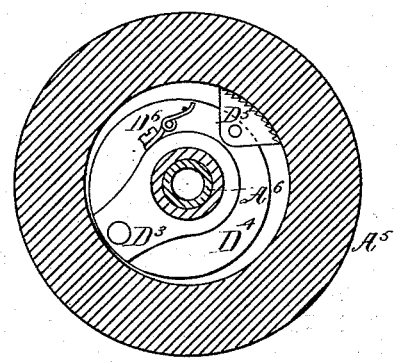
Figure 10:
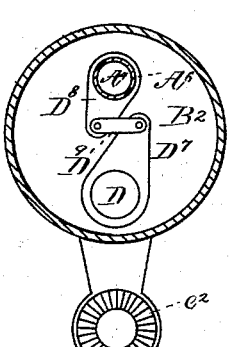
Figure 9:
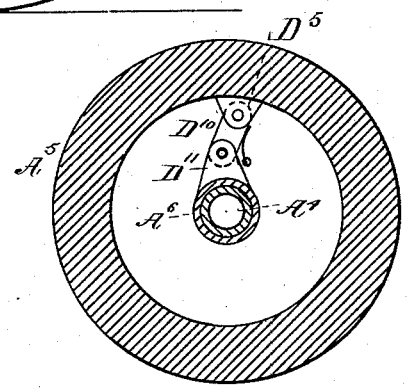
Figure 11:
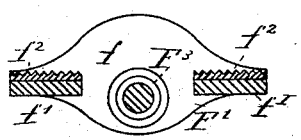
Figure 12:
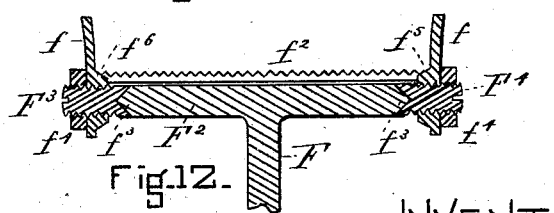
Figure 2:
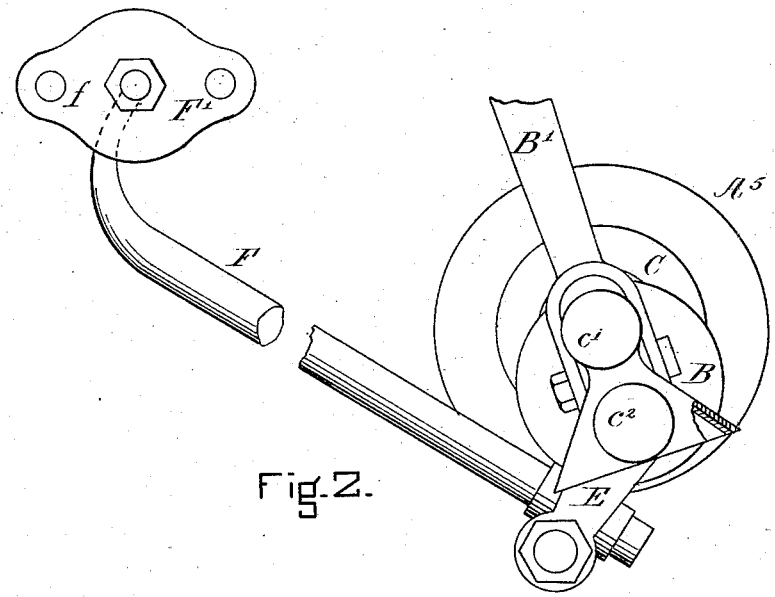
Figure 3:
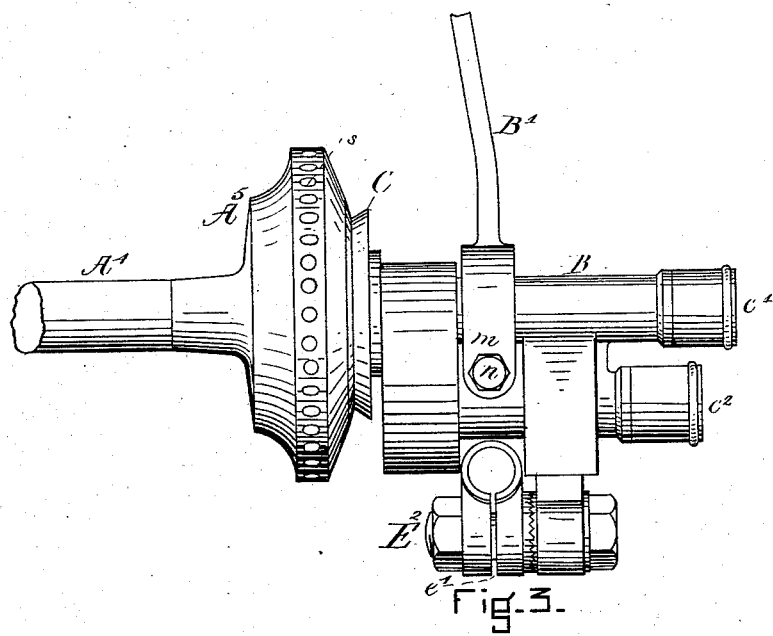
Figure 4:
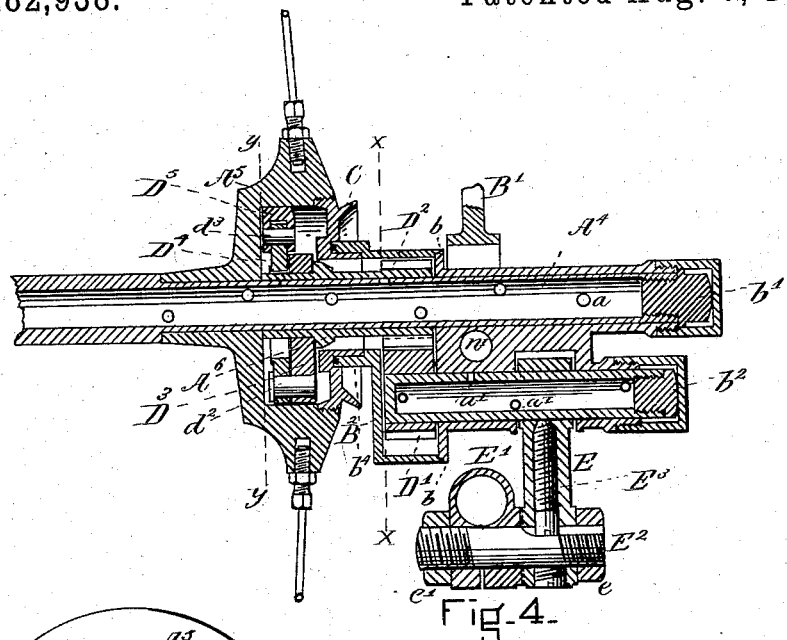
Figure 5:
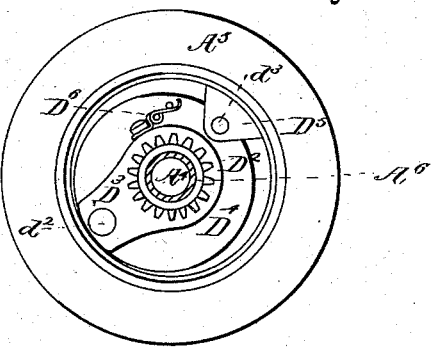
Figure 6:
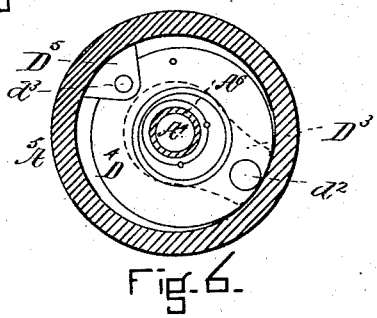
Figure 7:
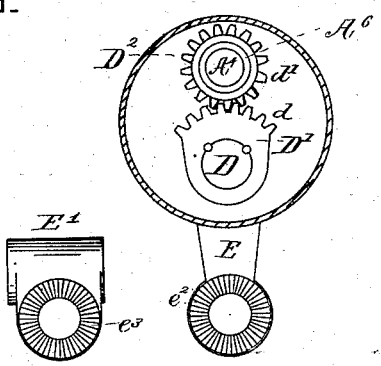

In the drawings, Figure 1 represents a two-wheeled velocipede containing my improvements in side elevation. Fig. 2 shows a side plan view of the driving mechanism made larger. Fig. 3 shows the same in elevation as seen from the rear—that is, at right angles to the plane of Fig. 2. Fig. 4 shows in vertical section the same parts as Fig. 3 on a plane passing through the center of the axle of the driving-wheel. Fig. 5 shows a view of a part of the contrivance as seen looking into the hub of the wheel from the dotted line $x\,x$, with the outer parts of the mechanism removed. Fig. 6 shows a part of the interior mechanism from the inside of the wheel looking outward, being a section on the dotted line $y\,y$. Fig. 7 shows in detail a part of the driving mechanism operating the secondary shaft, as seen from the left on the dotted line $x\,x$. Figs. 8, 9, and 10 show modifications of the mechanism which will be described farther on. Fig. 11 shows one end of my improved pedal, and Fig. 12 shows a vertical section through the middle of my improved pedal on a plane passing through the center of the pedal-pin or bearing-centers.

A is a front driving-wheel. A' is a rear wheel. $A^2$ is a head. $A^3$ is a perch. S is a saddle. $A^4$ is an axle to which a hub, $A^5$, is fixed. The wheel A is a suspension-wheel having two hubs or flanges, $A^5$, and my improvements in driving mechanism are applied to the outer end of each of these flanges, where a rigid wheel should be used having but one hub; or where two wheels should be used on the same axle, or on axles whose centers should be in the same line, obvious modifications would be made in the attachment of the driving mechanism.

B' is a front fork or part of the frame of a velocipede, at the bottom of which is a clamp, m, or equivalent means of attachment to a bearing-box. In the contrivance shown the clamp is of inverted-U shape, and in each arm is a hole, n, for a belt, which corresponds with a hole, n', in the bearing-boxes, and through which holes a belt is passed for securing the parts together.

B is a composite bearing-box, which, as constructed for the contrivance shown, contains a cylindrical part to form a bearing for the axle, a cylindrical part to form a bearing for a secondary or rocking shaft, a larger cylindrical part made hollow to inclose gears or other connecting mechanism between the secondary shaft, and a driving-shaft partly inclosed within this part and partly within a smaller cylindrical part which incloses the driving-shaft and takes a bearing against the cap or disk C, and which also has a part adapted to receive and cover a rocking lever, and another part adapted to receive a clamp for connecting with the front fork or frame of the velocipede. This composite bearing-box may be made in one solid piece of metal, consisting of the several parts enumerated; or it may be made in several parts attached together. As shown in the drawings, Fig. 4, it is divided at the points b b, so that the parts which inclose the adjacent ends of the driving-shaft and the secondary shaft and their connecting mechanism are in a separate piece, suitably fitted to the other, which for convenience is lettered $B^2$.

C is a disk or circular metallic cap, threaded on its outer periphery, and which may be screwed into the hub or flange $A^5$, between this disk C and the bearing of the composite box B $B^2$. Upon it I insert a felt washer, $b^3$, to prevent access of dust; and at the juncture of the parts of the composite box I usually make either a threaded joint or a felt insertion to keep out the dust.

b $b^2$ are screw-caps, as are also c' $c^2$.

a a a' a' are oil-holes.

D is a counter-shaft or rock-shaft. D' is a segment-gear, with teeth d.

$D^2$ is a toothed wheel, having teeth d', and which is attached to the driving shaft or sleeve $A^6$. This driving-shaft $A^6$, as shown in Fig. 1, is hollow, and incloses the axle $A^4$ both beyond and within the flange or hub $A^5$, and bears at one end the toothed wheel or pinion $D^2$, and at the other end an arm, $D^3$, fixed thereon. This arm or projection $D^3$ is shown in Fig. 5.

$D^4$ is an eccentric disk or link connected with $D^3$ by a pivot, $d^2$.

$D^5$ is a shoe connected with $D^4$ by a pivot, $D^3$.

$D^6$ is a spring attached to $D^3$ and operating against a small stud on $D^4$.

E is a rocking lever; E', a clamp, slotted at $e^4$.

$E^2$ is a bolt to secure the clamp E' and the rocking lever E together.

$E^3$ is a spline to hold E from turning on the secondary shaft D.

$e^2$ $e^3$ are serrated surfaces, by which the clamp E' and the lever E may be more securely held from turning upon each other when brought together by the bolt $E^2$.

F is a lever or arm connected at one end with a pedal, and at the other adapted to be held in the clamp E'.

F' is a pedal.

$F^2$ is a spindle, which may be attached to the lever F.

$F^3$ is a step for one end of the spindle $F^2$, and $F^4$ is a step for the other end of a spindle, $F^2$, $F^4$ being made adjustable by the means of an external thread working within an internal thread in the flange and its projections.

f f are flanges or end plates of the pedal.

f' f' are bars connecting the end plates or flanges.

$f^2$ $f^2$ are rubber bars.

$f^3$ $f^3$ are cone-centers on the spindle $F^2$, which take a pivot-bearing in the steps $F^3$ $F^4$. Instead of this specific construction, the concave conical parts of these bearings may be in the spindle and the convex conical parts in the steps.

$f^4$ $f^4$ are nuts.

$f^5$ $f^5$ are bushings or projections.

$D^7$, in Fig. 10, is a projection or arm of a different form from that shown at D', connected by the link $D^9$ with the projection $D^8$, attached to the shaft $A^6$.

$D^{10}$ is a link connecting an arm, $D^{11}$, attached to the shoe $A^6$ in place of the arm $D^3$, with the shaft $D^5$.

Heretofore the method of construction of pedals for bicycles has been to have the two end flanges connected by bars, and also by a hollow shaft or tube through the middle of the pedal between the flanges, or else segments of such a tube, and within this middle tube to have a pedal-pin, on the exterior of which were the bearings on which the pedal revolved or rocked, which might be called a "socket bearing pedal," while this which I have described is a center bearing pedal. The advantages of my improved construction are that the amount of friction is reduced, the weight is less, the pedal can be easily adjusted for wear, and it is also very neat in appearance. It is applicable to all bicycles in a velocipede where entire revolution of the pedal on its bearings is not required. I make the bars $f'$ $f'$ flat and wide and thin, and the bars $f^2 f^2$ of rubber, with a roughened upper surface, to afford the bearing for the sole of the boot of the rider. In this way I make a very light pedal, because most of the lower or idle half is removed. The method of adjustment is by loosening the set-nut $f^4$ and turning up the step $F^4$ with a screw-driver and otherwise until a proper bearing is formed, and then setting up the nut $f^4$ again. S' is a spring attached at one end to the fork B' or frame of the velocipede, and at the other end attached to the pedal-bearing bar F.

I make the bicycle with greater rake than usual—that is, fork B' inclines at a greater angle from the perpendicular through the driving-axle, as shown in Fig. 1. This carries the saddle S also farther back, and hence to retain the same position for the rider and a more nearly vertical position, as in working, than can be attained on the bicycle of usual construction, I carry the pedal F' farther back also. When the foot is pressed upon the pedal F', it depresses the bar F against the slight tension of the spring S', which serves, when pressure is withdrawn from the pedal F', to restore the bar to its upward position, as shown in Fig. 1. The bar F is adjusted for length by sliding it in the clamp E' and then tightening the clamp. The nuts $b'$ $b^2$ and $c'$ $c^2$ serve as caps to keep out the dust and keep in the oil, which latter may be injected into the hollow part of the axle $A^4$ and of the shaft D, and which thence works through the small oil-holes $a$ $a'$ and lubricates every part of the bearing-box and mechanism therein.

The operation of the machine constructed as shown in the drawings is as follows: Pressure of the foot applied at the pedal depresses the bar F, which swings the rocking lever E, which turns the secondary shaft D, which bears the arm or segment-gear D', (turning it in the opposite direction from the movement of the arm E,) which engages with the pinion $D^2$, (turning it to the right,) which is fixed upon the driving-shaft $D^3$, and carries the latter to the right or forward, which receives the arm or projection $D^3$, which, through the link or connecting-eccentric $D^4$, presses the block $D^5$ against the hub or flange $A^5$ within the recesses therein, and so turns the wheel A forward. The block $D^5$ is not pivoted to the link $D^4$ in a right line through the pivot $D^2$ and the center of the shaft $A^6$, but at a point forward of it, so that the forward movement of the link $D^4$ operates not only as an arm to drive the block $D^5$, and with it the wheel, forward, but also as a wedge to press the block $D^5$ outward against the interior wall of the flange, and of course the greater the power the harder the block bites. When the power is withdrawn the spring $D^6$ acts to throw the link $D^4$ backward and release the block $D^5$.

Instead of the segment-gear and pinion, as shown in Fig. 7, the arms and link shown in Fig. 10 may be used to accomplish the same result, and, I think, afford a stronger method of construction.

Instead of the eccentric or circular link $D^4$, (shown in Fig. 5 with the long arm $D^3$,) a shorter arm, $D^{11}$, and a shorter link, $D^{10}$, may be used, as shown in Fig. 9, when a spring is not necessary, as the operation of the shorter arm $D^{11}$ is such as to release the block $D^5$ immediately, and this construction is simpler than the other. The block $D^5$ may be serrated on the operating-edge, as shown in Fig. 8, and the wall of the cavity in the hub upon which it operates may be also serrated, so as to make a quicker and surer engagement between the block and the hub, though the friction bite is sufficient, I think, for practical use.

It is obvious that the parts may be constructed so as to make the wheel revolve through a greater or less part of a revolution at each depression of the bar F, and by this means the mechanism may be geared up or geared down for speed with greater power, or for ease with less speed.

I do not mean to limit myself to the precise construction and modifications shown in the embodying mechanism described, though I think I have shown the best form for attaching the same to a bicycle. In attaching my driving mechanism to a tricycle or other form of velocipede it may be desirable to use a different shape of the bar F, to place the secondary shaft D at a greater distance from the driving-shaft $A^6$, or to dispense with the secondary shaft and attach the arm E to the driving-shaft; or other modifications may be made, as required.

I am aware of Letters Patent No. 243,346, dated June 21, 1881, to J. B. Price, and No. 247,809, dated October 4, 1881, to J. Dutton, English Patent No. 1,956 of 1877, and I do not claim anything described and shown therein.

I claim as new and of my invention—

1. The described velocipede-pedal constructed with a frame having bars for bearings for the foot, end pieces formed to take the support of the pedal and the weight thereon, and containing seats for a spindle, one seat being adjustable, and a rocking spindle having center bearings in said seats and taking its support between the bearings, substantially as set forth.

2. Constructed and adapted for operating the secondary shaft of driving mechanism for a velocipede, the pedal-lever F, clamp E', and rocking lever E, substantially as shown and described.

3. Constructed and adapted to be combined with the frame and driving-wheel of a velocipede, the composite bearing-box B, having a bearing for support on the axle, a bearing for a driving-shaft, a bearing for a secondary shaft, and a cavity to inclose mechanism for connecting said shafts, an opening for a rocking lever, and a lug for attachment to the frame, essentially as set forth.

4. In a velocipede, the driving-shaft $A^6$, arm $D^3$, link $D^4$, block $D^5$, spring $D^6$, and a pinion, $D^2$, and gear $D'$, combined and constructed to operate substantially as and for the purposes specified.

5. In a velocipede, the combination of shaft D, arm E, and a pedal-lever attached thereto, arms $D^7$ and $D^8$, link $D^9$, and a fast and loose driving-shaft, $A^6$, with means of connecting the same with a driving-wheel, constructed and adapted to operate essentially as set forth.

6. The described two-wheeled safety velocipede, constructed with a small rudder-wheel and a large driving-wheel, a pedal-lever, F, secondary shaft D, and driving-shaft $A^6$, with connecting mechanism between said shafts and friction-clutch mechanism operating from said driving-shaft upon the hub of the driving-wheel, essentially as set forth.

CHARLES H. WARNER.

Witnesses:
C. S. HOWARD,
H. I. NASH.